(12) United States Patent
Manning et al.

(10) Patent No.: US 8,161,316 B1
(45) Date of Patent: Apr. 17, 2012

(54) MANAGING LOOP INTERFACE INSTABILITY

(75) Inventors: Michael Manning, Hopkinton, MA (US); Ashok Tamilarasan, Framingham, MA (US); Naizhong Chiu, Wayland, MA (US)

(73) Assignee: EMC Corporation, Hopkinton, MA (US)

( * ) Notice: Subject to any disclaimer, the term of this patent is extended or adjusted under 35 U.S.C. 154(b) by 253 days.

(21) Appl. No.: 12/241,708

(22) Filed: Sep. 30, 2008

(51) Int. Cl.
*G06F 11/00* (2006.01)
(52) U.S. Cl. ............... 714/5.1; 714/2; 714/6.1; 714/25; 714/42
(58) Field of Classification Search ............ 714/5, 47.1, 714/48, 4.2, 2, 6.13, 6.1, 25, 42
See application file for complete search history.

(56) References Cited

U.S. PATENT DOCUMENTS

| | | | |
|---|---|---|---|
| 6,714,976 B1 * | 3/2004 | Wilson et al. ............... 709/224 |
| 6,996,500 B2 * | 2/2006 | O'Konski et al. ............ 702/186 |
| 7,212,492 B1 * | 5/2007 | Au et al. ..................... 370/229 |
| 2001/0011357 A1 * | 8/2001 | Mori ........................... 714/25 |
| 2003/0005368 A1 * | 1/2003 | Beer et al. ................... 714/43 |
| 2005/0013318 A1 * | 1/2005 | Fike et al. ................... 370/462 |
| 2007/0067678 A1 * | 3/2007 | Hosek et al. ................. 714/25 |
| 2007/0088981 A1 * | 4/2007 | Noble et al. ................. 714/26 |
| 2007/0260915 A1 * | 11/2007 | Knapstad et al. ............ 714/6 |

* cited by examiner

*Primary Examiner* — Scott Baderman
*Assistant Examiner* — Sarai Butler
(74) *Attorney, Agent, or Firm* — Krishnendu Gupta; Jason A. Reyes; Deepika Bhayana

(57) ABSTRACT

A method is used in managing loop interface instability. It is determined that a loop has excessive intermittent failures. It is determined, based on whether the intermittent failures are detectable on another loop, whether the cause of the excessive intermittent failures is within a specific category of components. A search procedure is executed that is directed to the specific category of components, to isolate the cause of the excessive intermittent failures.

20 Claims, 7 Drawing Sheets

MANAGING LOOP INTERFACE INSTABILITY

FIELD OF THE INVENTION

The present invention relates generally to managing loop interface instability.

BACKGROUND OF THE INVENTION

Computers, computer networks, and other computer-based systems are becoming increasingly important as part of the infrastructure of everyday life. Networks are used for sharing peripherals and files. In such systems, complex components are the most common sources of failure or instability. The proliferation of multiple interacting components leads to problems that are difficult or impossible to predict or prevent. The problems are compounded by the use of networks, which introduce the added complexity of multiple machines interacting in obscure and unforeseen ways.

Most complex electronic devices, including computer systems and networked hardware, are designed with built-in diagnostics. These diagnostics are specifically designed for the system and usually detect a fairly wide range of problems. Sometimes they can also implement fixes or workarounds, or at least pinpoint a problem to speed its repair.

The use of interconnected components, although advantageous for performance and expandability, increases the risk of an error propagating through the system and causing widespread harm in the system.

For example, Fibre Channel ("FC") is a high performance, serial interconnect standard for bi-directional, point-to-point communications between servers, storage systems, workstations, switches, and hubs. Fibre Channel standards are described by the Fibre Channel Industry Association (FCIA) (http://www.fibrechannel.org). FC supports a variety of upper-level protocols, including the small computer systems interface ("SCSI") protocol. A device is linked to the network through an FC port and copper wires or optical fibres. An FC port includes a transceiver and an interface controller, which conducts lower-level protocol exchanges between the FC channel and the device in which the FC port resides.

Because of the high bandwidth and flexible connectivity provided by FC, FC is a common medium for interconnecting devices within multi-peripheral-device enclosures, such as redundant arrays of inexpensive disks ("RAIDs"), and for connecting multi-peripheral-device enclosures with one or more host computers. These multi-peripheral-device enclosures economically provide greatly increased storage capacities and built-in redundancy that facilitates mirroring and fail over strategies needed in high-availability systems. Although FC is well-suited for this application with regard to capacity and connectivity, FC is a serial communications medium. Malfunctioning peripheral devices and enclosures can, in certain cases, degrade or disable communications. FC-based multi-peripheral-device enclosures are expected to isolate and recover from malfunctioning peripheral devices.

In particular, an FC interface which connects devices in a loop such as a Fibre Channel Arbitrated Loop (FC-AL) is widely used in disk array apparatuses and the like, since it has a simple connecting configuration of cables and can easily accommodate device extensions. In this type of interface, when signals cannot propagate in the loop because of failures or the like in interface circuits of connected devices (this is called, for example, loop abnormality or link down), the whole loop cannot be used. That is, even though a failure occurs in only one device, all devices connected to the loop cannot be used. Thus, disk array apparatuses usually have interface circuits for two ports, so that these devices are connected to two independent loops. With this configuration, even when one loop of the dual loop interfaces is out of use because of a failure or the like, accesses can be performed using the other loop, to thereby improve reliability.

SUMMARY OF THE INVENTION

A method is used in managing loop interface instability. It is determined that a loop has excessive intermittent failures. It is determined, based on whether the intermittent failures are detectable on another loop, whether the cause of the excessive intermittent failures is within a specific category of components. A search procedure is executed that is directed to the specific category of components, to isolate the cause of the excessive intermittent failures.

One or more implementations of the invention may provide one or more of the following advantages.

A bad device causing intermittent failures can be correctly identified and kept off a Fibre Channel Arbitrated Loop, in order to maintain accessibility to other devices on the same Loop.

Other advantages and features will become apparent from the following description, including the drawings, and from the claims.

DETAILED DESCRIPTION

Figure 1:
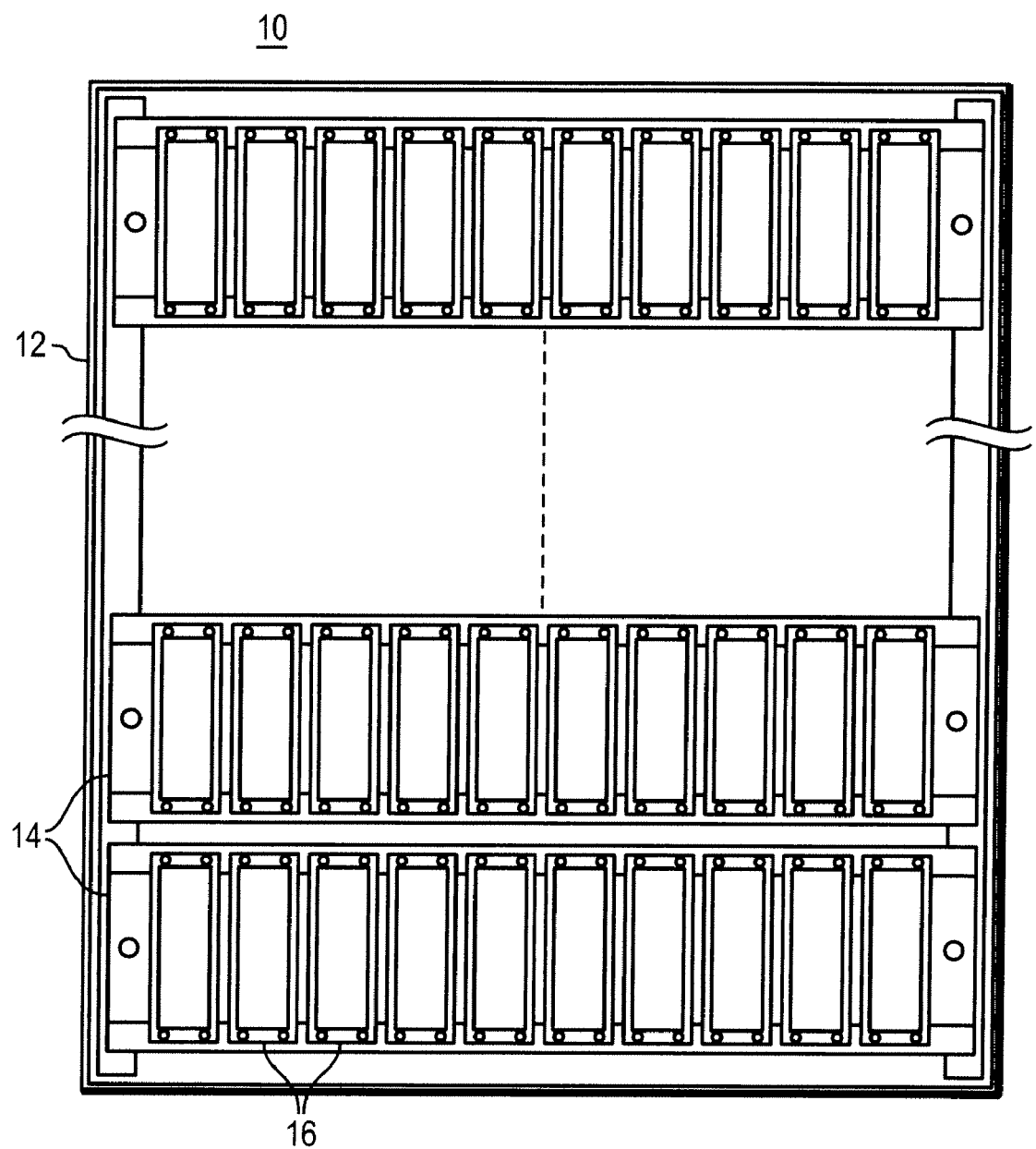
FIG. 1 is a representation of a rack mount system including several storage enclosures.

Described below is a technique for use in managing loop interface instability, particularly for use in identifying a bad component (e.g., a drive, link controller card (LCC), cable or enclosure of an example data storage system described below) causing loop instability.

Conventionally, in a data storage system, if a component is bad and is causing loop disturbance in such a way that the loop is "bouncing" causing software to re-initialize the loop repeatedly, it can cause input/output data transactions (I/Os) to be queued up and can cause multiple drives to be removed, input/output performance to be degraded, and can ultimately lead to a data unavailable/data loss (DU/DL) situation.

In particular, conventionally in the data storage system, when bad components cause software to re-discover the loop repeatedly, software holds off I/Os, issues commands so that drives can log back in, and then resumes the I/Os. If this conventional condition keeps repeating within a short period of time, the I/Os get backed up and the drive starts to take errors and may ultimately need to be removed. A single bad component conventionally can cause the entire loop to take lot of errors.

A conventional approach does not review the loop as a whole. Whenever the loop is unstable, conventionally, software removes drives that are reporting errors but the bad component may not be a drive. Since conventionally the bad component is not actually being removed, more instability results and ultimately I/Os get backed up, and the situation can lead to DU/DL. Also, conventionally, since I/Os can get backed up before they are resumed, the situation can lead to performance degradation and storage processor (SP) crashes. Furthermore, conventionally, identification of the bad component can be difficult for the user and multiple parts may end up being replaced.

At least one example implementation of the technique described herein tries to stabilize the loop, by detecting the fact that the components are causing loop disturbance by monitoring counts of Fibre Channel events such as Loop Initialization Primitives (LIPs) and determining, if a threshold is crossed, that the loop is unstable. At this point, any component (drive, LCC or cable) may be the cause of instability.

In the example implementation as applied to an example data storage system described below, processing starts by one SP asking its peer SP (also referred to simply as peer) whether it also detects the instability. If the peer also sees the instability, the cause is most likely the drive because that is the common component between the SPs. Thus, processing removes all unbound drives (drives not bound to a RAID group) and checks whether the loop is stable. If the loop is stable, it is determined that one of the removed drives is bad. Therefore, processing tries to isolate the bad drive by using a binary search method in which, in each iterative step, half of the drives are removed until the bad drive is found. If the loop remains unstable even after all the unbound drives are removed, a set of drives consisting of one drive per RAID group is removed. In at least one implementation, when a drive is removed, a rebuild logging process is started for that drive so that the drive does not have to do full rebuild when the drives comes back up later. If the loop stays stable, it is determined that a bad drive is in this set, and the binary search method is used to find the bad drive. If the loop does not stay stable, the set of drives is returned to the loop, their rebuilds are completed, and then the process is repeated using another set of drives consisting of one other drive per RAID group. If necessary, this is repeated using further sets of drives until the bad drive is found.

If the peer SP does not also see the instability, the cause is most likely the cable or the LCC. The process removes the last enclosure on the loop and check whether the loop is stable. If the loop is stable, it is determined that the cause of instability is the last enclosure, and it is taken offline. If the loop is still unstable, the previous enclosure is bypassed, and the process checks whether the loop is stable. This process continues until the bad component is found. In at least one implementation there is a small chance that a drive is bad on only one port and that situation is causing the loop to be unstable. In such a case, the drives are handled as described above.

Thus, by use of the technique, if the loop is unstable, components can be removed to determine whether the loop becomes stable and if so those components are kept removed, leaving the good components on the loop and helping to prevent DU/DL or I/O performance degradation. Also, by use of the technique, the bad component may be narrowed down to a single drive out of, for example, 120 drives, or if it is an LCC or cable, may be narrowed down to three components (two LCCs or a cable) instead of, for example, 16 potential components for a fully populated loop (8 LCCs and 8 cables).

Figure 2:
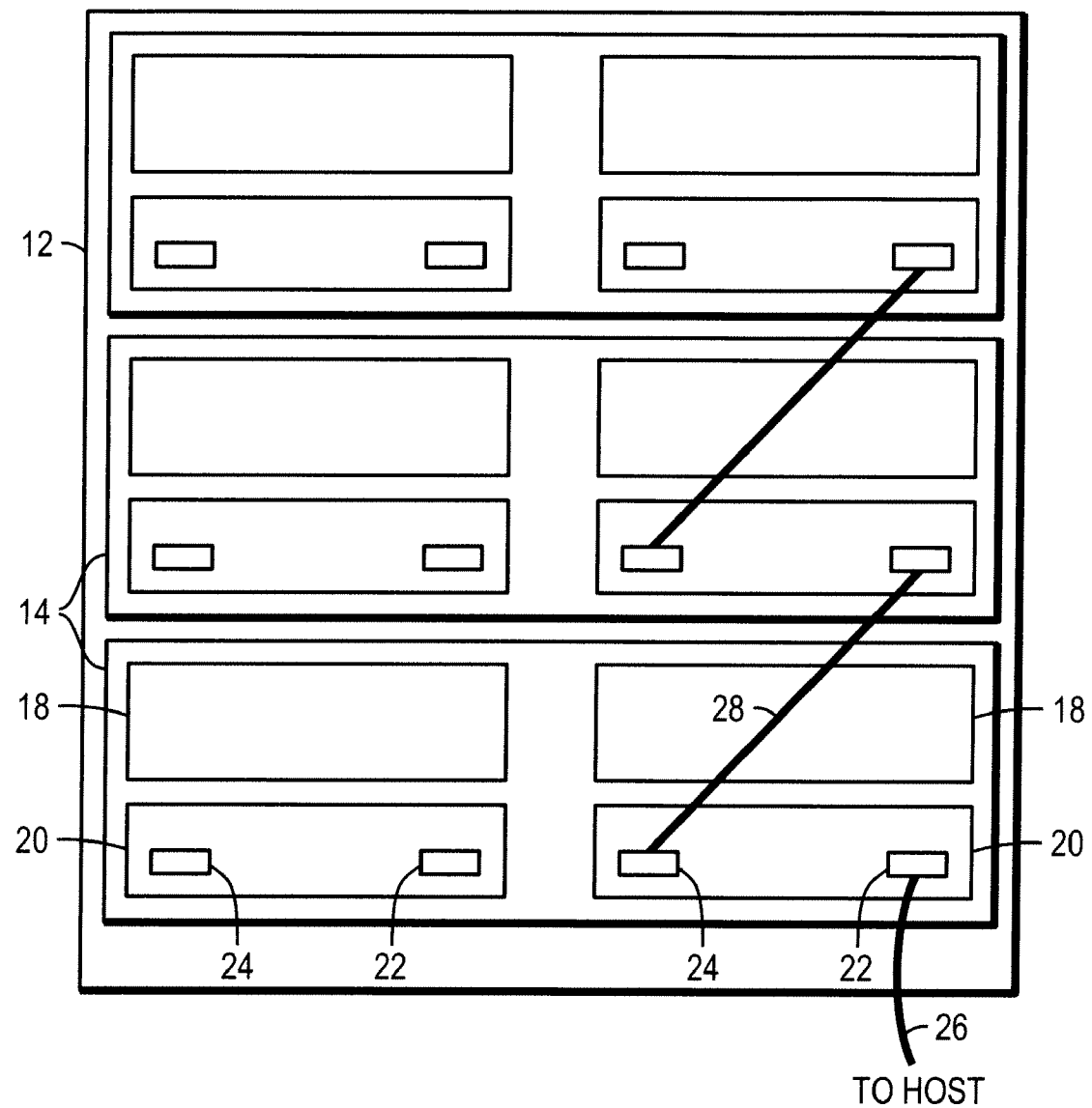
FIG. 2 is a rear view of the rack mount system and storage enclosures of FIG. 1.

Referring to FIG. 1 of the present application, there is shown an example of a storage system 10 in which the present invention may be employed. A rack mount cabinet 12 includes several storage enclosures 14. Each storage enclosure 14 includes several disk drives 16. The disk drives and the enclosures are preferably interconnected via a serial bus loop or ring architecture, e.g., Fibre Channel Arbitrated Loop (FC-AL). In FIG. 2 there is shown a rear view of the rack mount cabinet 12 and the storage enclosure 14. Each storage enclosure includes two power supplies 18, and two LCCs 20. The power supplies 18 and link control cards 20 are coupled to the disk drives 16 via a midplane within the chassis (not shown in FIG. 2). The link control card 20 serves to interconnect the disks and enclosures on the FC-AL.

Each link control card 20 includes a primary port 22 and an expansion port 24. These ports are used to link the storage enclosures together on a single FC-AL. A cable 26 may come from a host or from another storage system, and plugs into the primary port 22. The FC-AL extends from the primary port 22, is coupled to the disk drives 16, and continues out the expansion port 24. A cable 28 couples the expansion port 24 of a first storage enclosure 14 to the primary port 22 of a second storage enclosure 14. All the storage enclosures 14 are interconnected in this manner in a daisy chain to form the FC-AL. Thus, all the disk drives 16 are interconnected on the same FC-AL.

Each link control card 20 is capable of controlling all the disks 16 in a given enclosure.

Figure 3:
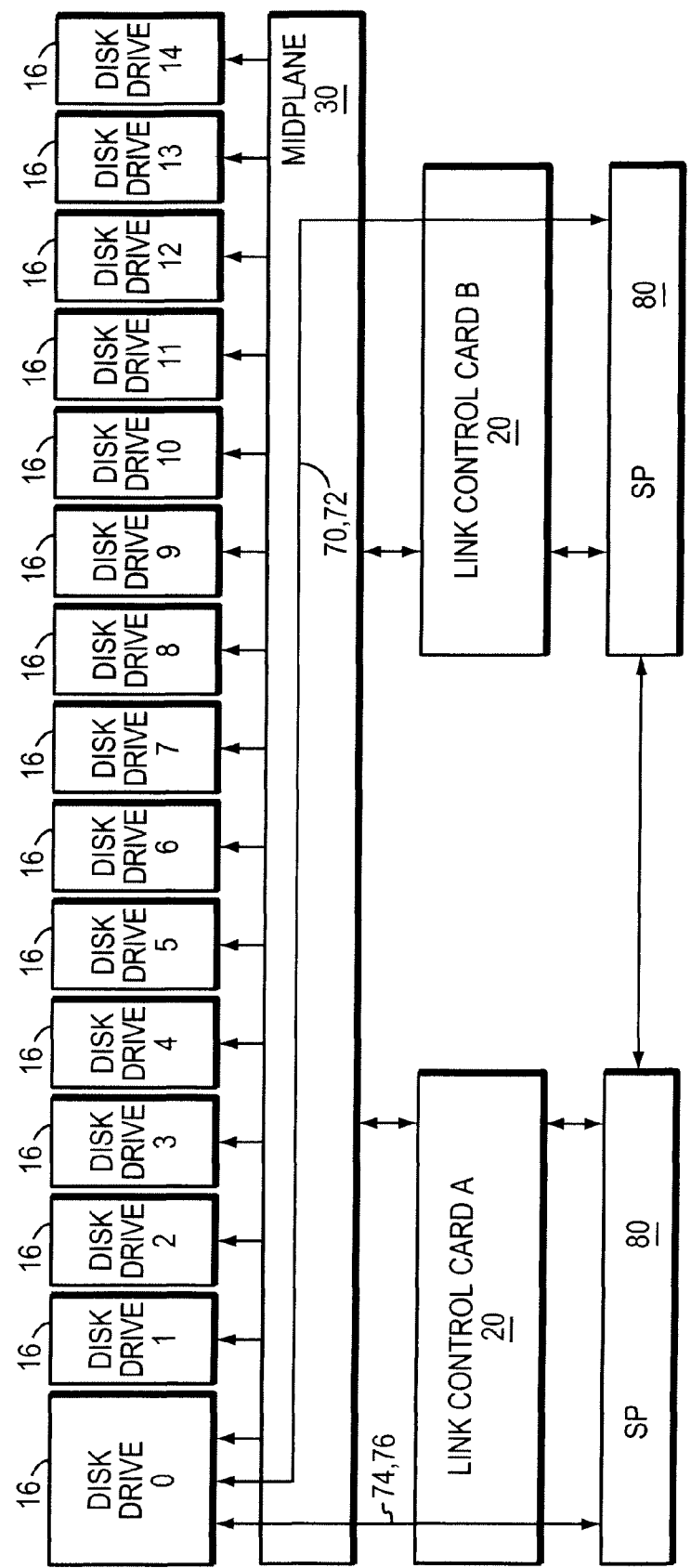
FIGS. 3-4 are block diagrams of components of the rack mount system and storage enclosures of FIG. 1.

FIG. 3 illustrates communication among drives 16, midplane 30, LCCA and LCCB 20, and storage processors 80. In at least some embodiments, storage processors 80 are controllers within the storage system that control the storage system's access to the storage enclosure, and are configured to communicate with each of drives 16 (exemplified by drive 0 in FIG. 3) over respective Fibre Channel links (loops) 74, 70, and over respective diplexing links 76, 72 as described in U.S. Pat. No. 5,901,151 to Bleiweiss, et al. entitled "System for orthogonal signal multiplexing", which is hereby incorporated herein by reference in its entirety.

The system may include a diagnostic section (which may be included within the SPs) which regularly polls the enclosures at a rate of typically 500 milliseconds, and can communicate with an enclosure not yet added to the FC-AL, e.g., by using the diplexing links. In a particular example, such communication could use a diplexed signal which is a transmission comprising two distinct signals that have been modulated together and transmitted over a single transmission wire. The signals are generally transmitted at frequencies and may also be transmitted at different voltage levels. One example of a diplexed signal is the piggybacking of an RS232 protocol signal over Fibre Channel protocol signal lines, which may be done in storage area networked environments. The RS232 protocol is a standard for serial transmission of data between two devices, normally carrying between ±5V and ±12V on both data and control signal lines. The Fibre Channel signals generally have a lower voltage. The diplexed signals are typically separated at their destinations by a filter device into the RS232 and Fibre Channel signals, and forwarded as appropriate.

Figure 4:
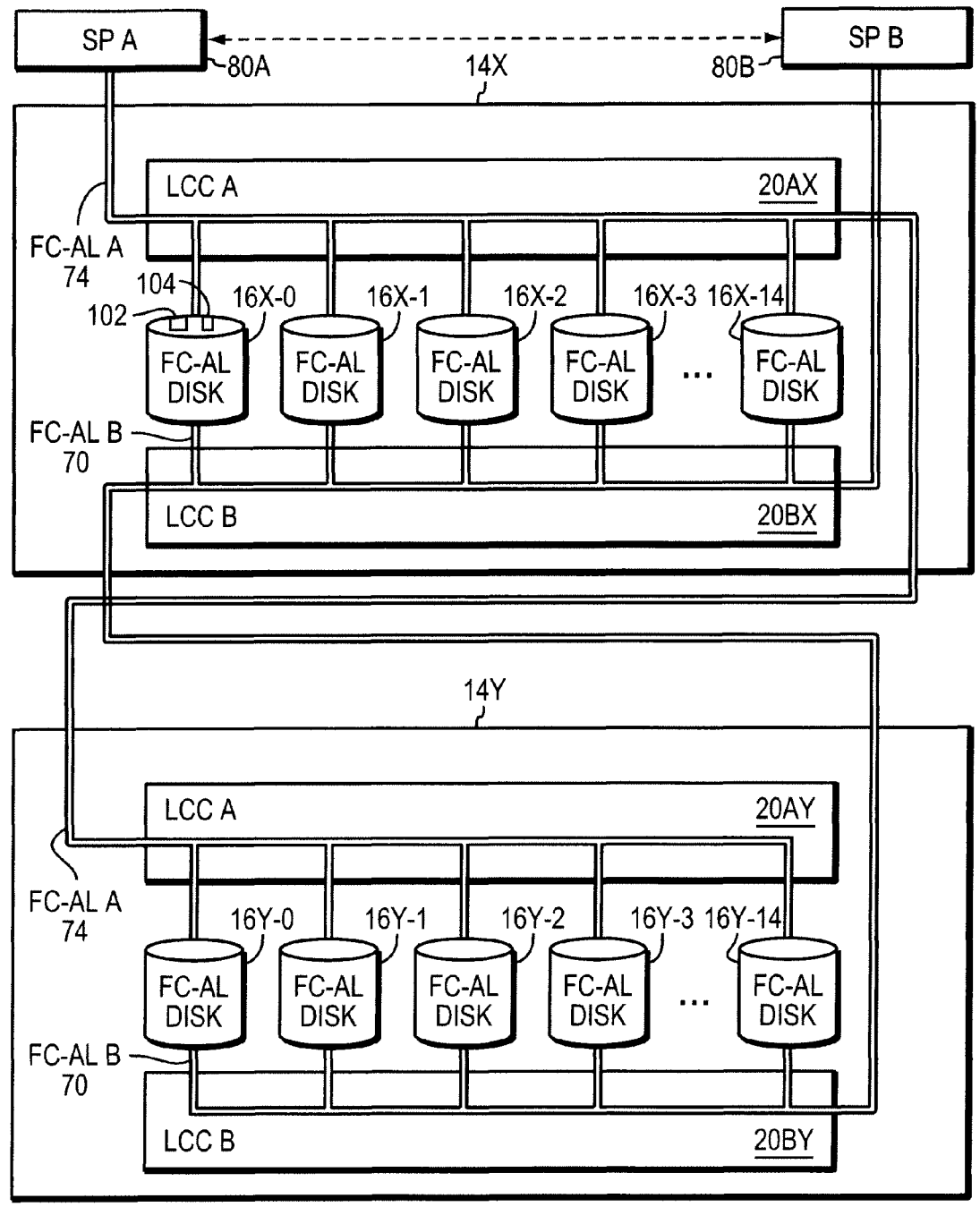

FIG. 4 illustrates an example implementation of system 10 having enclosures 14 (specifically 14X, 14Y) in communication with SPs 80 (specifically 80A, 80B) using FC-AL loops 74, 70. (Mechanically, SPs 80A, 80B may or may not be included in one of enclosures 14X, 14Y.) Enclosure 14X has LCCs 20AX, 20BX and disks 16X-0 through 16X-14, and enclosure 14Y has LCCs 20AY, 20BY and disks 16Y-0 through 16Y-14. Loop 74 allows SP 80A to communicate with disks 16X-0 through 16X-14 via LCC 20AX, and with disks 16Y-0 through 16Y-14 via LCC 20AY. Loop 70 allows SP 80B to communicate with disks 16X-0 through 16X-14 via LCC 20BX, and with disks 16Y-0 through 16Y-14 via LCC 20BY.

Each of disks 16X-0 through 16X-14 and 16Y-0 through 16Y-14 has a FC receiver and a FC transmitter for each loop connection. For example, disk 16X-0 has receiver 102 and transmitter 104. Thus, a communication directed from SP 80A to disk 16Y-14 is first received at disk 16X-0 by receiver 102 and is transmitted by transmitter 104 to disk 16X-1, which in turn passes the communication along to disk 16X-2, and so on. The communication passes between enclosures when disk 16X-14 passes it to disk 16Y-0, which in turn passes it to disk 16Y-1, and so on. Ultimately the communication reaches its destination, disk 16Y-14. As shown in FIG. 4, a communication directed from disk 16Y-14 to SP 80A travels directly to SP 80A since there are no disks between disk 16Y-14 and SP 80A in that direction on the loop.

With respect to each loop, one or more disks or enclosures may be set, e.g., using the diplex signals, to a bypass mode such that FC signals travel along the loop as if the disks or enclosures were not on the loop. For example, if enclosure 14Y is set to bypass mode, a communication directed from disk 16X-14 to SP 80A travels directly to SP 80A since there are no disks between disk 16X-14 and SP 80A in that direction on the loop when enclosure 14Y is not on the loop. In another example, if disk 16X-2 is set to bypass mode, a communication directed from SP 80A to disk 16X-4 passes directly from disk 16X-1 to disk 16X-3 on its way to disk 16X-4.

Bypass mode only affects FC signals, not diplex signals.

A characteristic of an FC loop is that if any device, e.g., LCC, drive, or cable, on the loop has an intermittent problem passing communications along the loop, it is possible for the problem to disable the entire loop (i.e., cause the entire loop to fail) intermittently, which can adversely affect performance and lead to erroneous conclusions about whether components are bad.

Diplex signaling works largely independently of FC communications, such that devices may still be discoverable via diplex signaling even if the FC loop is broken.

If a device (e.g., drive) on the loop has an intermittent problem, this problem may prevent the device from adequately passing communications along the loop and therefore may disable the entire loop intermittently unless the device is bypassed.

Figure 5:
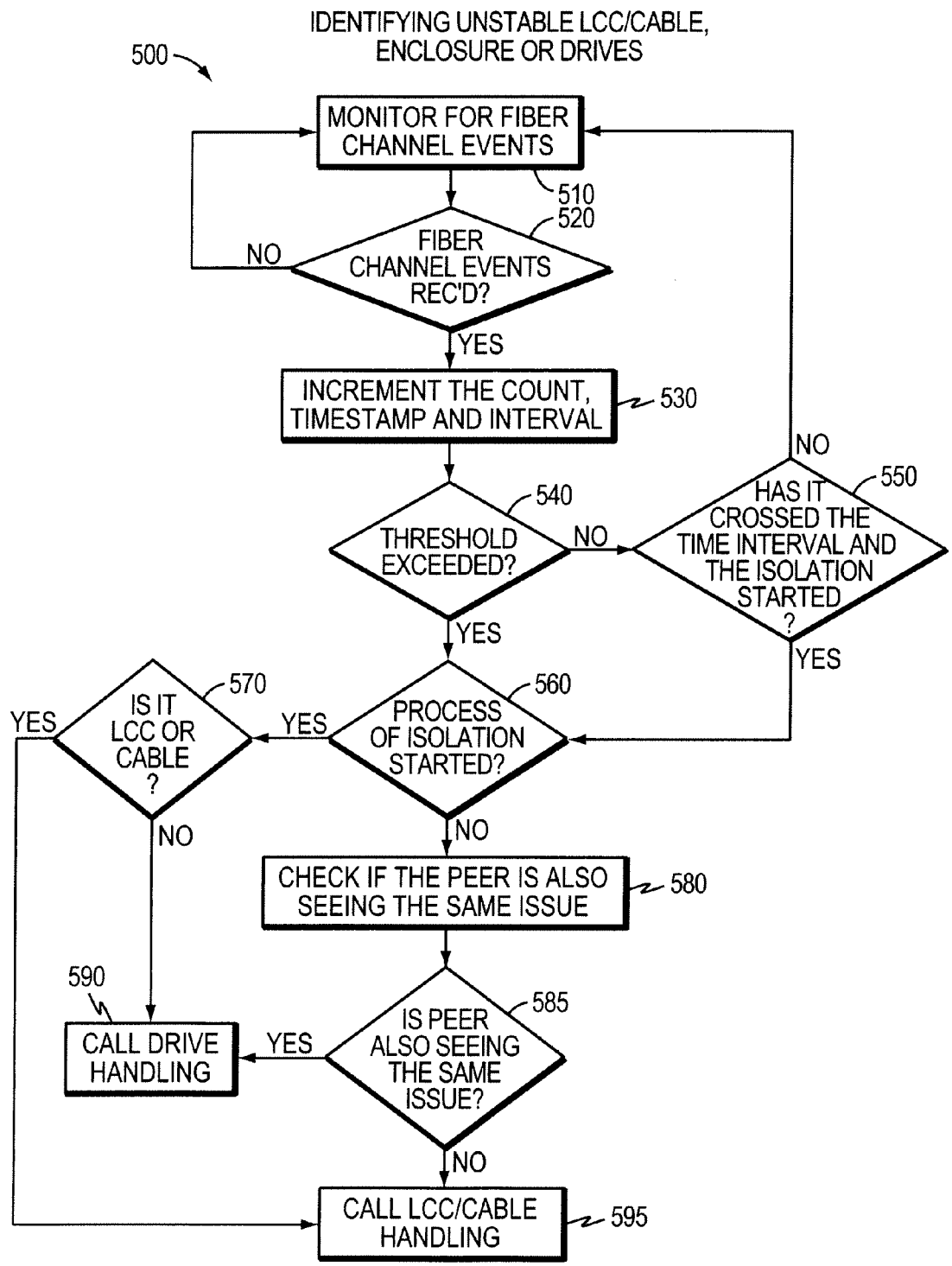
FIGS. 5-7 is a flowchart of a procedure that may be used with the rack mount system of FIG. 1.
Figure 6:
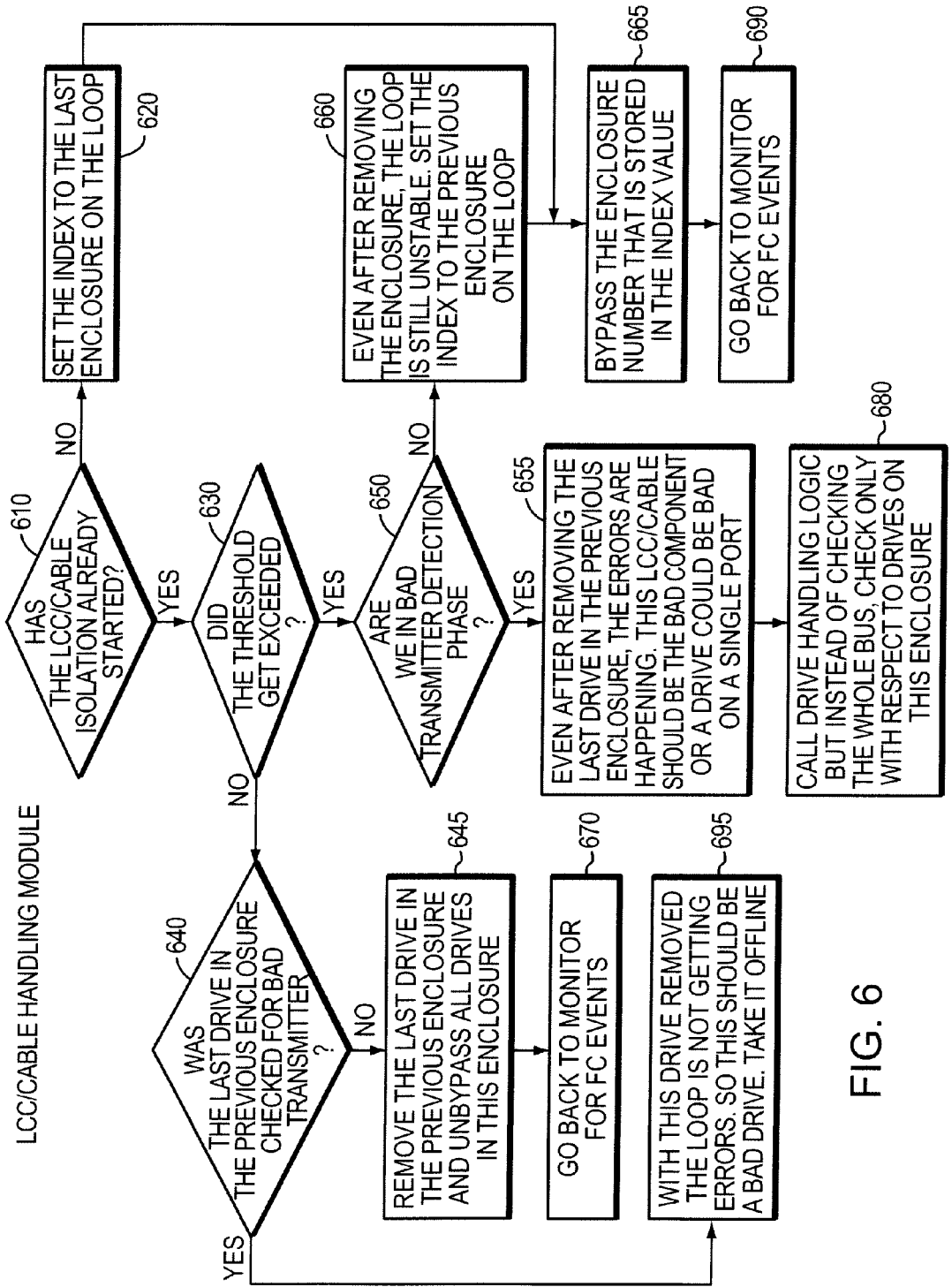
Figure 7:
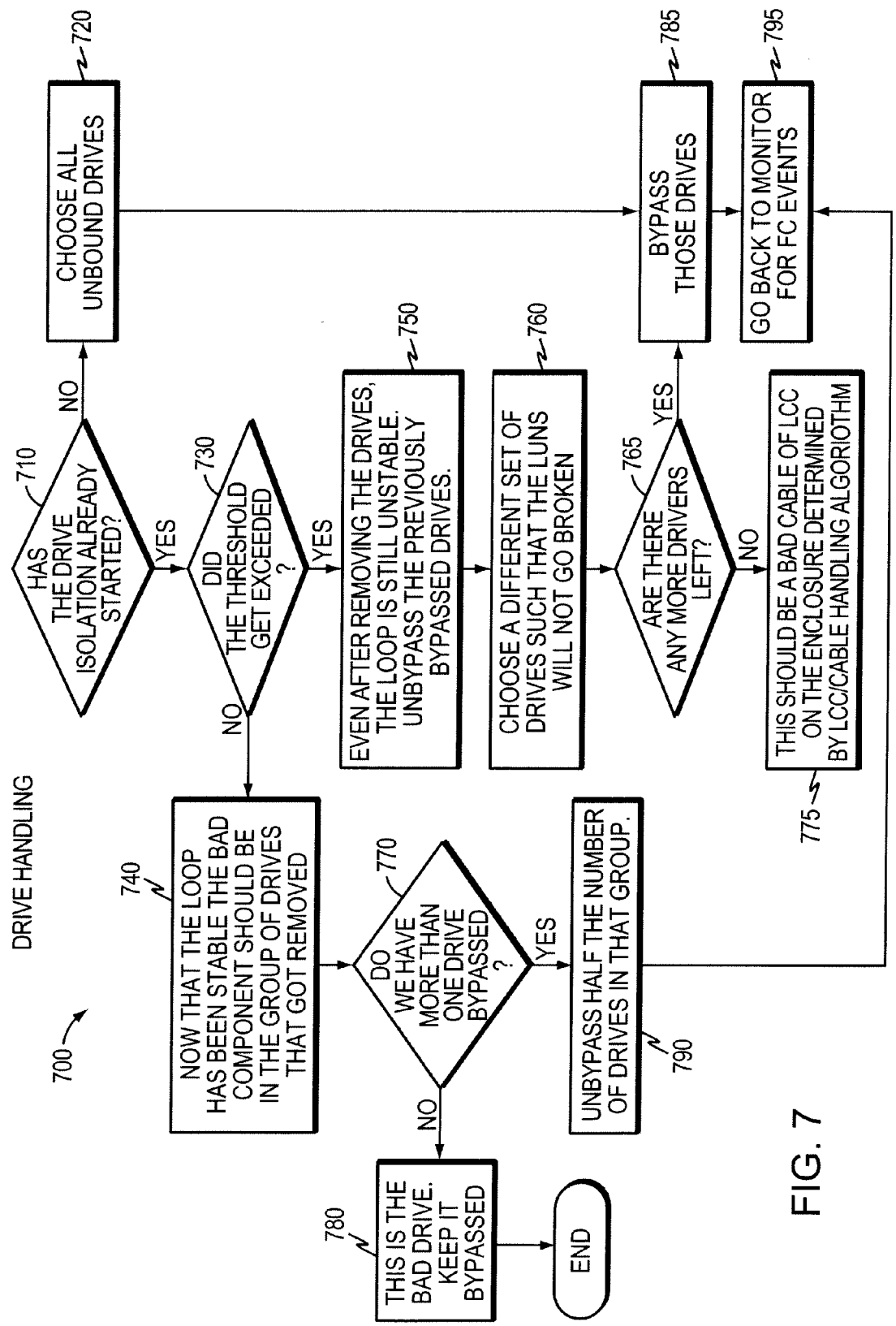

FIGS. 5-7 illustrate aspects 500, 600, 700 of an example implementation of the technique for use in managing loop interface instability.

With respect to FIG. 5, Fibre Channel events are monitored for (steps 510, 520). A count of such events is incremented and a timestamp and interval are recorded (step 530). If the count does not exceed a threshold (step 540), and a time interval has not expired and isolation has not started (step 550), monitoring continues. If the count exceeds the threshold (step 540) and isolation has not started (step 560), it is determined whether the peer is also detecting excessive events (step 580). If so, drive handling procedure 700 (FIG. 7) is invoked (step 590). If not, LCC/cable handling procedure 600 (FIG. 6) is invoked (step 595).

If the count does not exceed the threshold (step 540) and a time interval has not expired and isolation has started (steps 550, 560), it is determined whether the isolation is directed to LCC/cable handling (step 570). If so, LCC/cable handling procedure 600 (FIG. 6) is invoked (step 595). If not, drive handling procedure 700 (FIG. 7) is invoked (step 590).

With respect to FIG. 6, if isolation has not already started (step 610), an index is set to identify the last enclosure on the loop (step 620), the identified enclosure is bypassed (step 665), and processing continues from step 510 (FIG. 5). If isolation has already started (step 610) and the threshold was not exceeded (step 630), it is possible that the drive in the previous enclosure could have a bad transmitter (step 640). If the drive has not been processed on the previous enclosure, the drive is bypassed and the bypass of all the drives in this enclosure is reversed (step 645) and processing continues from step 510 (FIG. 5). If the drive with the bad transmitter is processed and no further errors are being taken, the drive in the previous enclosure is the bad drive and is taken offline (step 695)

If the threshold was exceeded (step 630), it is determined whether it is a bad transmitter detection phase (step 650). If it is not the bad transmitter phase, it is determined that the loop is still unstable despite the bypassed enclosure and the index is set to identify the enclosure on the loop previous to the currently bypassed enclosure (step 660). The identified enclosure is bypassed (step 665), and processing continues from step 510 (FIG. 5). If it is the bad transmitter phase (step 650), it is determined that the cause is not the drive in the previous enclosure but is within this enclosure (step 655), and the drive handling procedure 700 is invoked for only the bypassed enclosure (step 680).

With respect to FIG. 7, if drive isolation has not already started (step 710), all unbound drives are chosen (step 720) and are bypassed (step 785) before processing continues from step 510 (FIG. 5). If drive isolation has already started (step 710) and the threshold was exceeded (step 730), it is determined that the loop is still unstable even after the last set of drives was bypassed, and the bypass of the last set of drives is reversed (step 750). The process selects another set of drives that, when bypassed, will not cause logical volumes (LUNs) to fail (step 760). If there are drives that can be bypassed (step 765) the set is bypassed (step 785) before processing continues from step 510 (FIG. 5) (step 795). If there are no drives that can be bypassed, it is the LCC/Cable that was determined in FIG. 6 in Step 680 to be the bad component.

If drive isolation has already started (step 710) and the threshold was not exceeded (step 730), it is determined that since the loop has been stable the bad component is in the last set of drives that was bypassed (step 740). If only one drive was bypassed (step 770), it is determined to be the bad drive and is left bypassed (step 780). If more than one drive was bypassed (step 770), for half of the drives, the bypass is reversed (step 790) before processing continues from step 510 (FIG. 5) (step 795).

Thus, for example, with respect to the system of FIG. 4, if SP A detects that Fibre Channel events are occurring excessively often on loop 74, it is then determined whether SP B is detecting excessive events on loop 70 as well. If not, it is determined that the cause is an LCC or cable. Enclosure 14Y is bypassed on loop 74, so that LCC A 20AY is no longer on loop 74, and if SP A no longer detects excessive events, it is determined that the cause was an LCC or cable of enclosure 14Y.

On the other hand, if SP B is detecting excessive events on loop 70 as well, it is then determined that the cause is a disk. All of disks 16X and 16Y are examined to determined which disk may be the cause, i.e., may be the bad disk. Sets of disks selected in order of least adverse impact on the system are bypassed in turn, to narrow down the location of the bad disk. Once a set is found that, when bypassed, alleviates the excessive events, the set is searched within for the bad disk. Searches are conducted by bypassing selected disks, determining whether the excessive events situation has improved, and if not, reversing the bypass of those disks, and selecting other disks for bypass, and iterating this process.

Other embodiments are within the scope of the following claims. For example, the technique may be used for non-FC types of loop architectures.

What is claimed is:

1. A method for use in managing loop interface instability, the method comprising:
   monitoring an event in a data storage system, wherein the data storage system includes a storage processor and a peer storage processor, wherein a first loop enables the storage processor to communicate with a set of disk drives using a set of link controller cards, wherein a second loop enables the peer storage processor to communicate with the set of disk drives using the set of link controller cards, wherein the event indicates an intermittent failure, wherein monitoring of the event comprises monitoring a count of the event, recording a time at which the event occurs and recording a time interval at which the event occurs;
   determining, based on whether the count exceeds a threshold, the time interval expires, and identification of a cause of the event has started, whether the first loop is unstable, wherein the threshold indicates excessive intermittent failures;
   determining, based on whether the intermittent failures are detectable by the peer storage processor on the second loop, whether the cause of the excessive intermittent failures is within a specific category of components, wherein the specific category of components is selected from the group consisting of the set of link controller cards, a cable and the set of disk drives; and
   executing a search procedure directed to the specific category of components, to isolate the cause of the excessive intermittent failures, wherein the search procedure is directed to the set of disk drives if the intermittent failures are detectable by the peer storage processor on the second loop, wherein the search procedure is directed to the set of link controller cards if the intermittent failures are not detectable by the peer storage processor on the second loop.

2. The method of claim 1, wherein the loop comprises a Fibre Channel Arbitrated Loop.

3. The method of claim 1, wherein the specific category of components comprises disk drives.

4. The method of claim 1, wherein the specific category of components comprises cables.

5. The method of claim 1, wherein the specific category of components comprises link controller cards.

6. The method of claim 1, further comprising:
   monitoring counts of Fibre Channel events.

7. The method of claim 1, further comprising:
   monitoring counts of Loop Initialization Primitives.

8. The method of claim 1, further comprising:
   determining, based on whether the intermittent failures are detectable by a peer component on the other loop, whether the cause of the excessive intermittent failures is a disk drive.

9. The method of claim 1, further comprising:
   executing a binary search method until the cause is found.

10. The method of claim 1, further comprising:
    in the search procedure, removing disk drives having data that is protected by RAID.

11. The method of claim 1, wherein the cause is found to be a disk drive, the method further comprising:
    when the disk drive is removed, starting a rebuild logging process for the disk drive.

12. The method of claim 1, further comprising:
    in the search procedure, removing one disk drive per RAID group on the loop.

13. The method of claim 1, further comprising:
    in the search procedure, removing a last enclosure on the loop.

14. The method of claim 1, further comprising:
    in the search procedure, removing enclosures one by one from the loop until the intermittent failures are not excessive.

15. A system for use in managing loop interface instability, the system comprising:
    first logic monitoring an event in a data storage system, wherein the data storage system includes a storage processor and a peer storage processor, wherein a first loop enables the storage processor to communicate with a set of disk drives using a set of link controller cards, wherein a second loop enables the peer storage processor to communicate with the set of disk drives using the set of link controller cards, wherein the event indicates an intermittent failure, wherein monitoring of the event comprises monitoring a count of the event, recording a time at which the event occurs and recording a time interval at which the event occurs;
    second logic determining, based on whether the count exceeds a threshold, the time interval expires, and identification of a cause of the event has started, whether the first loop is unstable, wherein the threshold indicates excessive intermittent failures;
    third logic determining, based on whether the intermittent failures are detectable by the peer storage processor on the second loop, whether the cause of the excessive intermittent failures is within a specific category of components, wherein the specific category of components is selected from the group consisting of the set of link controller cards, a cable and the set of disk drives; and
    fourth logic executing a search procedure directed to the specific category of components, to isolate the cause of the excessive intermittent failures, wherein the search procedure is directed to the set of disk drives if the intermittent failures are detectable by the peer storage processor on the second loop, wherein the search procedure is directed to the set of link controller cards if the intermittent failures are not detectable by the peer storage processor on the second loop.

16. The system of claim 15, wherein the loop comprises a Fibre Channel Arbitrated Loop.

17. The system of claim 15, wherein the specific category of components comprises disk drives.

18. The system of claim 15, wherein the specific category of components comprises cables.

19. The system of claim 15, wherein the specific category of components comprises link controller cards.

20. The system of claim 15, further comprising:
    fifth logic monitoring counts of Fibre Channel events.

* * * * *